US012646025B2

(12) United States Patent
Barcziova et al.

(10) Patent No.: US 12,646,025 B2
(45) Date of Patent: Jun. 2, 2026

(54) DELTA BASED TASK ANALYSIS FOR CI SYSTEMS

(71) Applicant: Red Hat, Inc., Raleigh, NC (US)

(72) Inventors: Laura Barcziova, Galanta (SK); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 662 days.

(21) Appl. No.: 17/964,388

(22) Filed: Oct. 12, 2022

(65) Prior Publication Data

US 2024/0127148 A1 Apr. 18, 2024

(51) Int. Cl.
| *G06Q 10/0631* | (2023.01) |
| *G06F 8/658* | (2018.01) |
| *G06F 9/48* | (2006.01) |
| *G06F 9/50* | (2006.01) |

(52) U.S. Cl.
CPC ....... *G06Q 10/06316* (2013.01); *G06F 8/658* (2018.02); *G06F 9/4881* (2013.01); *G06F 9/5005* (2013.01); *G06F 2209/5017* (2013.01)

(58) Field of Classification Search
CPC . G06Q 10/06316; G06F 8/658; G06F 9/4881; G06F 9/5005; G06F 2209/5017
See application file for complete search history.

(56) References Cited

U.S. PATENT DOCUMENTS

| 9,384,045 B2 * | 7/2016 | Doster ................. G06F 9/4881 |
| 9,477,521 B2 | 10/2016 | Truong et al. |

| 10,872,028 B2 | 12/2020 | Kuris et al. |
| 11,386,245 B2 | 7/2022 | D'Antuono et al. |
| 2012/0204014 A1 * | 8/2012 | Leather ................. G06F 9/3888 |
| | | 712/223 |
| 2014/0240745 A1 * | 8/2014 | Boldt ...................... G06F 3/121 |
| | | 358/1.14 |
| 2017/0010889 A1 * | 1/2017 | Spektor ..................... G06F 8/71 |
| 2018/0121240 A1 * | 5/2018 | Cai ........................ G06F 9/4881 |
| 2020/0278916 A1 * | 9/2020 | Kuris ................. G06F 11/3612 |
| 2022/0261274 A1 | 8/2022 | Raghavendran et al. |

FOREIGN PATENT DOCUMENTS

| CN | 104040500 B | 3/2018 |
| CN | 113010840 A | 6/2021 |
| WO | 2015112170 A1 | 7/2015 |

* cited by examiner

*Primary Examiner* — Bradley A Teets
*Assistant Examiner* — Willy W Huaracha
(74) *Attorney, Agent, or Firm* — Womble Bond Dickinson (US) LLP

(57) ABSTRACT

Systems and methods for a delta based task analysis in CI systems are disclosed. The systems and methods analyze a first job, which includes multiple first tasks, and a second job, which includes multiple second tasks. The systems and methods identify a set of different tasks between the first tasks and the second tasks. The systems and methods then create a third job based on the set of different tasks, which includes metadata corresponding to the first job and the second job. The systems and method execute the first job and the third job, which completes the second job based on the metadata included in the third job.

18 Claims, 6 Drawing Sheets

500 ⟶

Analyzing a first job and a second job, wherein the first job comprises a plurality of first tasks and the second job comprises a plurality of second tasks, and wherein the analyzing identifies a set of different tasks between the plurality of first tasks and the plurality of second tasks.
502

Creating a third job based on the set of different tasks, wherein the third job comprises metadata corresponding to the first job and the second job.
504

Executing the first job and the third job, wherein the executing of the first job and the third job completes the second job based on the metadata included in the third job.
506

Figure 5:
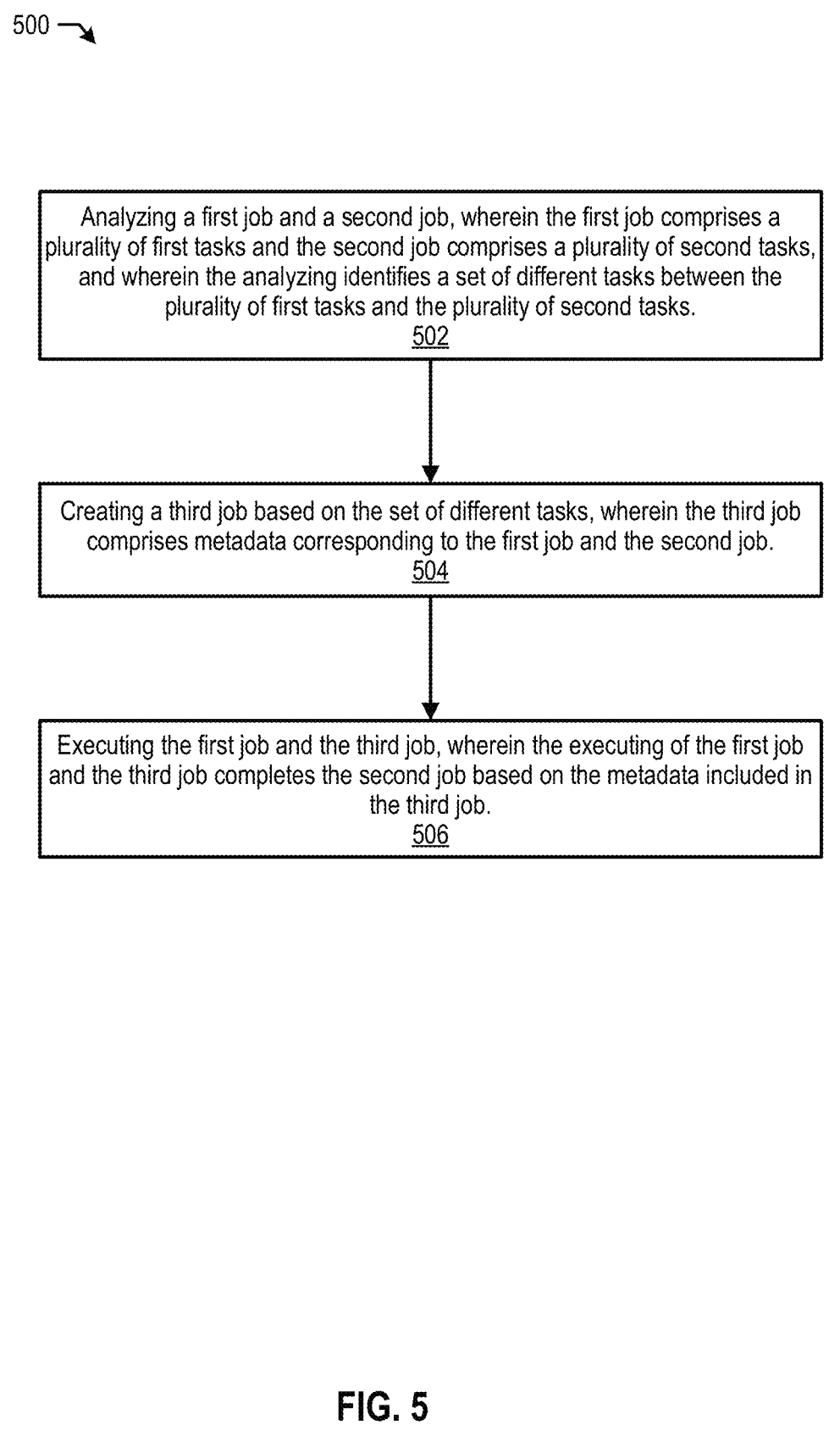

500 ⟶

Analyzing a first job and a second job, wherein the first job comprises a plurality of first tasks and the second job comprises a plurality of second tasks, and wherein the analyzing identifies a set of different tasks between the plurality of first tasks and the plurality of second tasks.
502

↓

Creating a third job based on the set of different tasks, wherein the third job comprises metadata corresponding to the first job and the second job.
504

↓

Executing the first job and the third job, wherein the executing of the first job and the third job completes the second job based on the metadata included in the third job.
506

DELTA BASED TASK ANALYSIS FOR CI SYSTEMS

TECHNICAL FIELD

Aspects of the present disclosure relate to continuous integration (CI) systems, and more particularly, to a delta based task analysis system for executing jobs in a CI system.

BACKGROUND

Continuous integration is a coding philosophy and set of practices that drive development teams to frequently implement small changes in code to version control repositories. Users require a mechanism to integrate and validate the code changes because modern applications typically require developing code using different platforms and tools. Goals of CI include establishing a consistent and automated approach to build, package, and test applications. With consistency in the integration process in place, users are more likely to commit code changes more frequently that, in turn, leads to better collaboration and software quality.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is a flow diagram of a method of reusing common tasks, creating a new delta task job, and executing the common tasks and new delta task job, in accordance with some embodiments of the present disclosure.

DETAILED DESCRIPTION

Conventional CI systems utilize a job queue that allows for parallel job executions. Jobs often have similar characteristics, or tasks, that are common to jobs of a particular type. Unfortunately, when multiple jobs share similar tasks and characteristics for execution, resources are wasted (CPU, memory, storage) on executing the similar tasks and do not leverage caching capabilities at the task level, which is costly in a cloud environment and restrictive in a source constrained environment.

The present disclosure addresses the above-noted and other deficiencies by reusing common tasks to reduce resource requirements and increase efficiency in a CI system. In some embodiments, a processing device analyzes two existing jobs that each include multiple tasks. The processing devices creates a new job based on a set of different tasks between the two existing jobs and includes metadata in the new job that corresponds to the two existing jobs. The processing device executes one of the existing jobs and the new job, which completes the other existing job using the metadata included in the new job.

In some embodiments, the processing device identifies a set of continuous common tasks between the two existing jobs. The processing device then identifies a fork location, in one of the existing jobs, between the set of continuous common tasks and the set of different tasks. The processing device then inserts a fork command at the identified fork location, which adds a branch that branches to the new job subsequent to the execution of the set of continuous common tasks. In some embodiments, the set of continuous common tasks are included in both existing jobs in a same order and the set of different tasks are included in one of the existing tasks and are absent from the other existing task. In some embodiments, the metadata indicates similarities between the two existing job and also indicates differences between the two existing jobs. In some embodiments, the processing device inserts a new task into the new job based on the differences between the two existing jobs.

By reusing common tasks, creating a new delta task job, and executing the common tasks and new delta task job, the present disclosure decreases the overall amount of resources required to execute multiple jobs and improves overall CI system efficiency.

Figure 1:
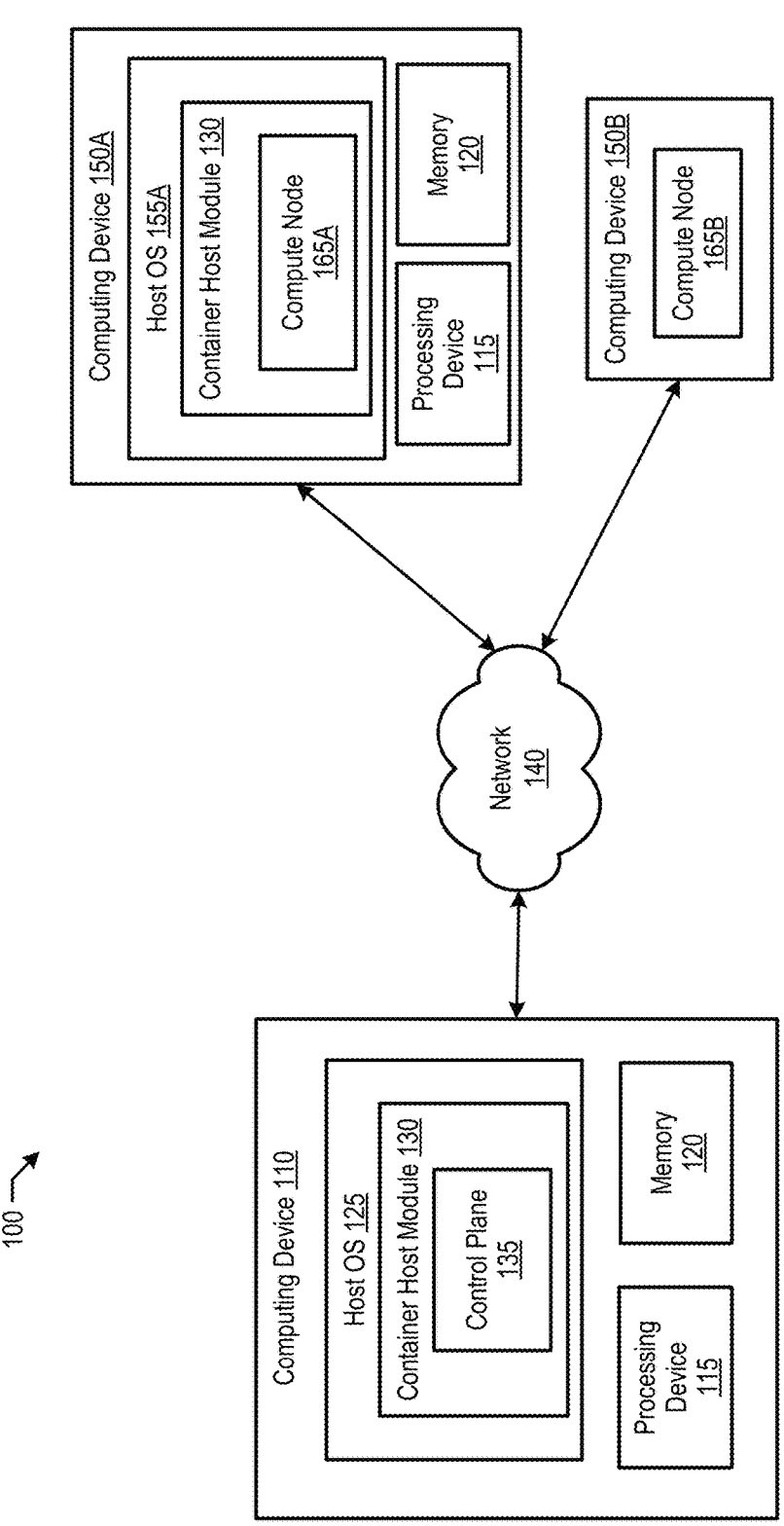
FIG. 1 is a block diagram that illustrates an example system, in accordance with some embodiments of the present disclosure.

FIG. 1 is a block diagram that illustrates an example system 100, in accordance with some embodiments of the present disclosure. As illustrated in FIG. 1, system 100 includes a computing device 110, and a plurality of computing devices 150. The computing devices 110 and 150 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In some embodiments, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 150. Each of computing devices 110 and 150 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may include any suitable type of computing device or machine that has a programmable processor including, for example, server computers, desktop computers, laptop computers, tablet computers, smartphones, set-top boxes, etc. In some examples, each of the computing devices 110 and 150 may include a single machine or may include multiple interconnected machines (e.g., multiple servers configured in a cluster). The computing devices 110 and 150 may be implemented by a common entity/organization or may be implemented by different entities/organizations. For example, computing device 110 may be operated by a first company/corporation and one or more computing devices 150 may be operated by a second company/corporation. Each of computing device 110 and computing devices 150 may execute or include an operating system (OS) such as host OS 125 and host OS 155 respectively, as discussed in more detail below. The host OS of a computing devices 110 and 150 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 150 may each implement a compute node (e.g., as part of the container orchestration engine).

In some embodiments, a container orchestration engine 130 (referred to herein as container host 130), such as the Redhat™ OpenShift™ module, may execute on the host OS 125 of computing device 110 and the host OS 155 of computing device 150, as discussed in further detail herein. The container host module 130 may be a platform for developing and running containerized applications and may allow applications and the data centers that support them to expand from just a few machines and applications to thousands of machines that serve millions of clients. Container host 130 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 130 provides a function-based architecture of smaller, decoupled units that work together. In some embodiments, computing device 150 may execute on an operational cloud. Compiler 138 may also execute on host OS 125. When a user inserts an annotation into a code base, in accordance with some embodiments, compiler 138 detects the annotation and inserts a permission wrapper around corresponding methods in the compiled code.

Container host 130 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 130 or a registry server. In some embodiments, the image file may include one or more base layers. An image file may be shared by multiple containers. When the container host 130 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each include static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 130 may work with are called pods. A pod may refer to one or more containers deployed together on a single host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, they are assigned to run on a node, and they run until their container(s) exit or they are removed based on their policy and exit code. Although a pod may contain more than one container, the pod is the single unit that a user may deploy, scale, and manage. The control plane 135 of the container host 130 may include replication controllers (not shown) that indicate how many pod replicas are required to run at a time and may be used to automatically scale an application to adapt to its current demand.

By their nature, containerized applications are separated from the operating systems where they run and, by extension, their users. The control plane 135 may expose applications to internal and external networks by defining network policies that control communication with containerized applications (e.g., incoming HTTP or HTTPS requests for services).

A typical deployment of the container host 130 may include a control plane 135 and a cluster of compute nodes 165, including compute nodes 165A and 165B (also referred to as compute machines). The control plane 135 may include REST APIs which expose objects as well as controllers which read APIs, apply changes to objects, and report status or write back to objects. The control plane 135 manages workloads on the compute nodes 165 and also executes services that are required to control the compute nodes 165. For example, the control plane 135 may run an API server that validates and configures the data for pods, services, and replication controllers as well as provides a focal point for the cluster 165's shared state. The control plane 135 may also manage the logical aspects of networking and virtual networks. The control plane 135 may further provide a clustered key-value store (not shown) that stores the cluster 165's shared state. The control plane 135 may also monitor the clustered key-value store for changes to objects such as replication, namespace, and service account controller objects, and then enforce the specified state.

The cluster of compute nodes 165 are where the actual workloads requested by users run and are managed. The compute nodes 165 advertise their capacity and a scheduler (not shown), which is part of the control plane 135, determines which compute nodes 165 containers and pods will be started on. Each compute node 165 includes functionality to accept and fulfill requests for running and stopping container workloads, and a service proxy, which manages communication for pods across compute nodes 165. A compute node 165 may be implemented as a virtual server, logical container, or GPU, for example.

Figure 2:
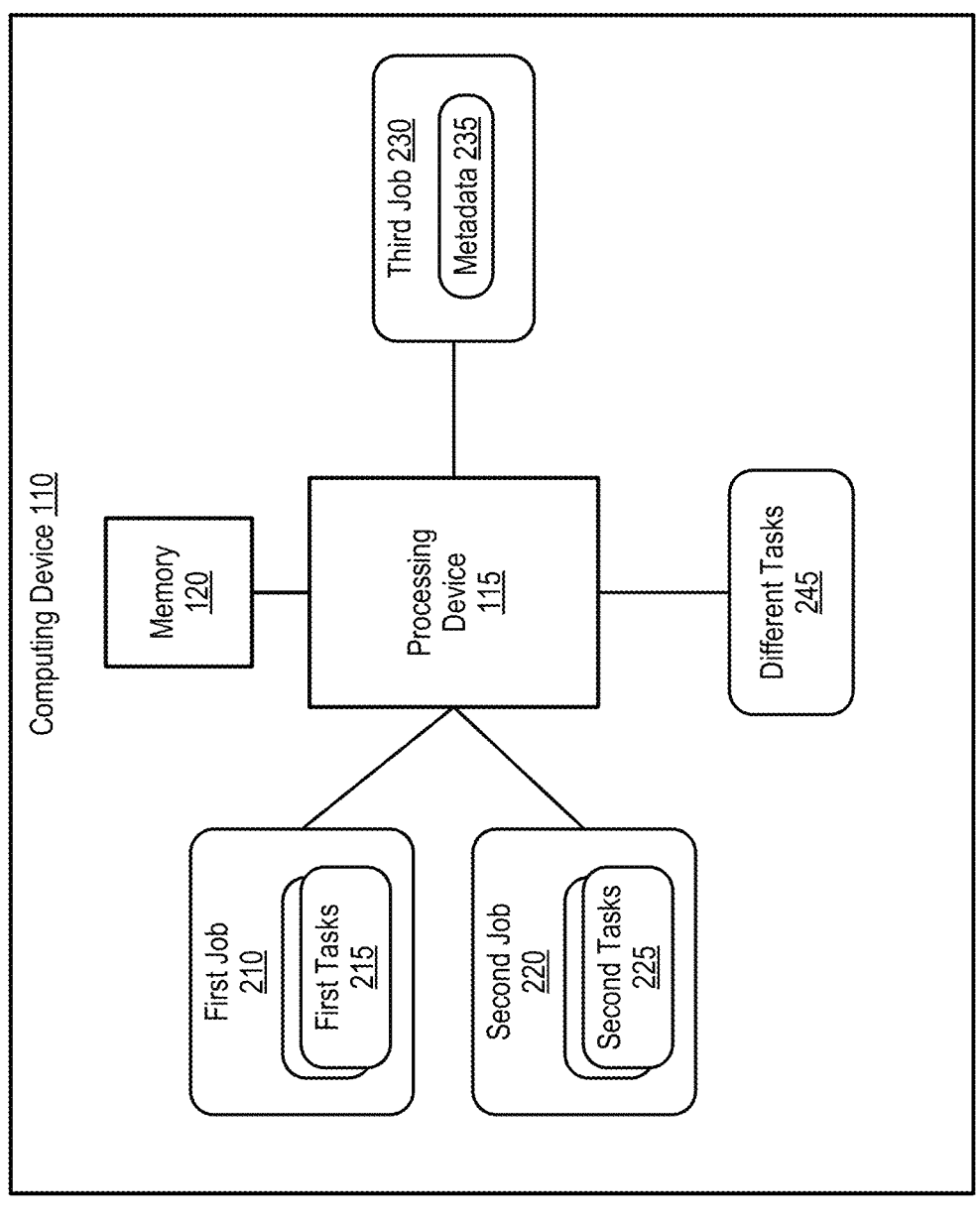
FIG. 2 is an illustration of an example of a computer system that reuses common tasks between multiple jobs to reduce overall resource requirements, in accordance with some embodiments of the present disclosure.

FIG. 2 is an illustration of an example of a computer system that reuses common tasks between multiple jobs to reduce overall resource requirements, in accordance with some embodiments of the present disclosure. Computing device 110 includes processing device 115, which executes instructions in memory 120 to analyze first job 210 and second job 220. In some embodiments, first job 210 and second job 220 are in a job queue ready for execution.

First job 210 includes first tasks 215 and second job 220 includes second tasks 225. During the analysis, processing device 115 identifies a set of different tasks 245 between first tasks 215 and second tasks 225 (see FIGS. 3A, 3B, and corresponding text for further details). Each task in the set of different tasks 245 is included in either the first tasks 215 or the second tasks 225 (but not both) and is absent from the other. The processing device 115 creates third job 230 based on the different tasks 245 and inserts metadata 235 into third job 230 that corresponds to first job 210 and second job 220. In some embodiments, metadata 235 depends on the nature of the job and includes information corresponding to the tasks in third job 230. For example, metadata 235 may include information about a file path to copy a downloaded file, a symlink (symbolic link) to point to a file location, and/or information to identify a Git commit for a job such as commit SHA, name of the repository, etc. In turn, processing device 115 executes first job 210 and third job 230, therefore completing second tasks 225 in second job 220 without executing the common tasks in second job 220.

In some embodiments, in order to identify the set of different tasks 245, processing device 115 analyzes configuration files in the job queue for upcoming builds and performs an analysis on the task information included in the configuration files. For example, the job queue may include [configfile1:task a, task b, . . . ], [configfile2: task a, task c, . . . ], and processing device 115 compares the config file contents (tasks, order, etc.) of each job to the file contents of other jobs in the job queue to ascertain whether commonalities exist between the configuration files. When processing device 115 detects common, continuous tasks (e.g., two or more) within multiple jobs, processing device 115 isolates the jobs and performs a delta analysis on the isolated files. Two or more tasks may be common and continuous when those tasks are included in two or more existing jobs and in the same order in each of the two or more existing jobs. The result of the delta analysis is a difference in tasks between the two jobs, which processing device 115 stores as different tasks 245 and uses to create third job 230.

In some embodiments, processing device 115 inserts a fork into first job 210 where the difference in tasks occurs. When first job 210 executes and reaches the fork, first job 210 continues execution and the fork branches to third job 230, which uses metadata 235 to ensure that processing device 115 uses, for example, the correct name and identifiers when executing different tasks 245. As such, the multiple jobs progress and complete more efficiently by reusing the same common execution steps. In some embodiments, processing device 115 uses additional policies to ensure that jobs are appropriately identified to share job states, such as ensuring that jobs have the same triggers (e.g., a Github action), ensuring the owners of the job have similar permissions, etc.

In some embodiments, processing device 115 may enable a lookback style capability, such as an 80:20 caching manner where 80% of processing resources are spent on executing 20% of the requests. In these embodiments, processing device 115 captures snapshots and saves processing states for each execution and retains the snapshots in memory 120 for a period of time, in some embodiments. When new jobs enter the queue, processing device 115, in addition to comparing the new jobs with existing jobs in the queue, also compares the new jobs across the time based snapshots history that is stored in memory. Processing device 115 may then instantiate a new job at an advanced step in its task progression by taking the snapshot at a point in time from the history and continuing the execution.

In some embodiments, using Red Hat products such as the Packit tool, processing device 115 identifies similar jobs for similar families of RPM (RPM Package Manager) based distributions, such as jobs for CentOS Stream and Fedora. In these embodiments, processing device 115 builds out the customized changes for each task list by reusing constituent parts, thereby saving time and effort.

In some embodiments using systems such as RHEL (Red Hat Enterprise Linux), which builds Fedora and CentOS, the present disclosure reduces the job profile size to constituent differences between the three OS's and creates a generic job family.

In some embodiments, processing device 115 creates a fully formed job (third job 230) that is executable as a stand-alone job. In some embodiments, the present disclosure abstracts out and creates a new job based on the difference output and creates a well-formed semantically interpretable job. In some embodiments, the present disclosure programmatically handles nuances (differences) between jobs, such as moving files from an external location to internal locations having different directories.

Figure 3:
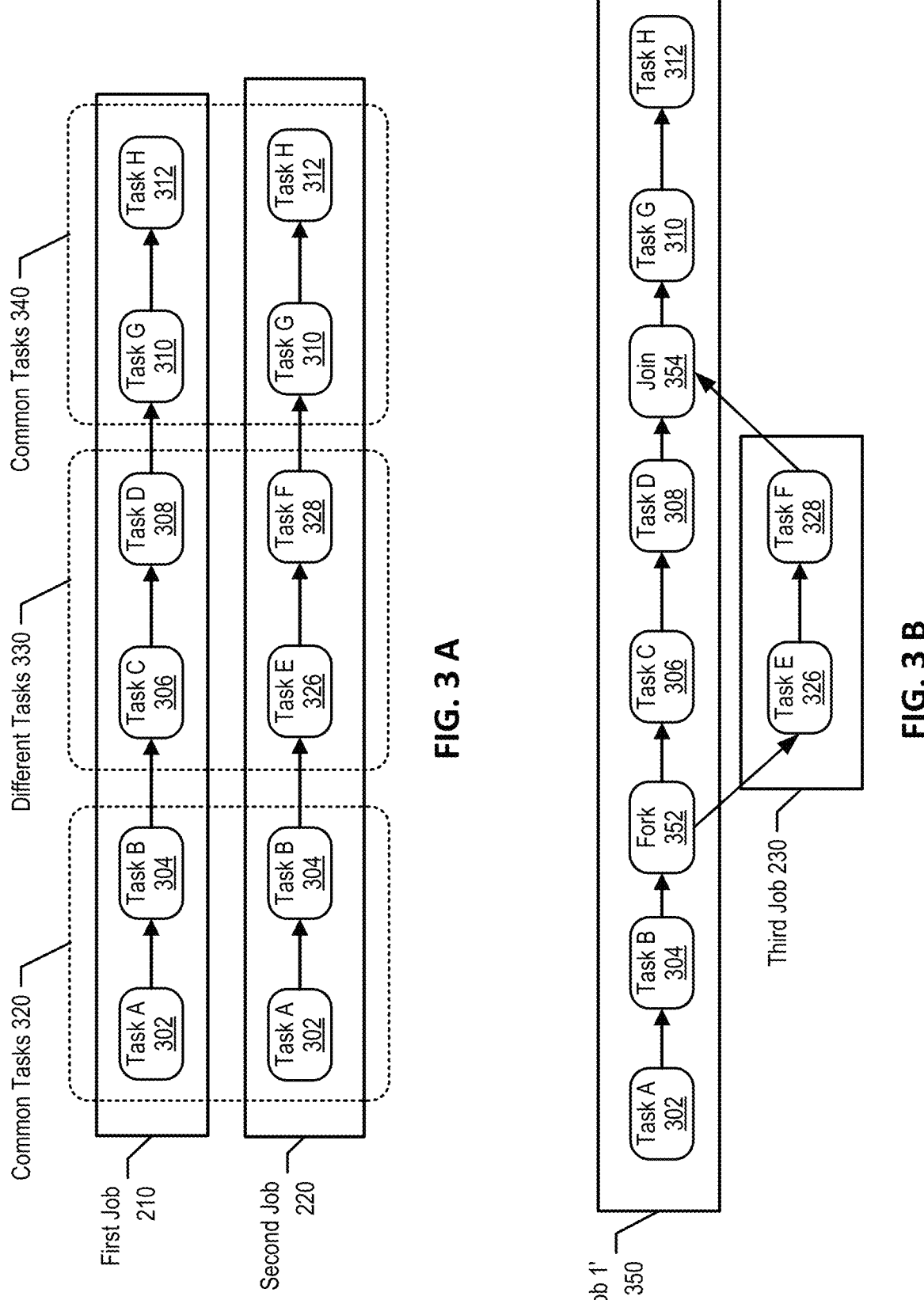
FIG. 3A is an illustration of an example that shows common tasks and different tasks between two jobs, in accordance with some embodiments of the present disclosure.
FIG. 3B is an illustration of an example that shows a modified existing job and a new job based on different tasks between two queued jobs, in accordance with some embodiments of the present disclosure.

In some embodiments, the present disclosure integrates a job from a forking and joining perspective where a stand-alone job has similarities and differences and an integrating perspective (see FIG. 3A, 3B, and corresponding text for further details). In some embodiments, the present disclosure populates a file using programming abstractions to read the strings from a diff file and insert the strings into third job 230 in a logical manner.

FIG. 3A is an illustration of an example that shows common tasks and different tasks between two jobs, in accordance with some embodiments of the present disclosure. First job 210 includes task A 302, task B 304, task C 306, task D 308, task G 310 and task H 312. Second job 220 includes task A 302, task B 304, task E 326, task F 328, task G 310, and task H 312. First job 210 and second job 220 include similar continuous tasks denoted as common tasks 320 and common tasks 340. First job 210 and second job 220 also have different tasks, denoted as different tasks 330.

When processing device 115 analyzes first job 210 and second job 220, processing device 115 stores task E 326 and task F 328 (e.g., different tasks 245) and proceeds to create a new job from the different tasks (see FIG. 3B and corresponding text for further details).

FIG. 3B is an illustration of an example that shows a modified existing job and a new job based on different tasks between two queued jobs, in accordance with some embodiments of the present disclosure. FIG. 3B includes job 1' 350 and third job 230. Job 1' 350 includes each of the tasks of first job 210 and also includes fork 352 and join 354. Fork 352 instructs processing device 115 to fork to third job 230 in addition to continuing with executing tasks in job 1' 350. As discussed herein, processing device 115 creates third job 230 from analyzing first job 210 and second job 220. Third job 230 includes the different tasks between first job 210 and second job 220.

Processing device 115 executes job 1' 350 starting at task A 302, then task B 304, then reaches fork 352, where processing device 115 forks to third job 230 while also continuing job 1' 350 and executing task C 306. Third job 230 executes task E 326 and task F 328 and then joins back into job 1' at join 354. At this point, job 1' 350 has completed task C 306 and task D 308. Then, job 1' 350 executes task G 310 and task H 312. In turn, processing device 115 completes the combined twelve tasks included in first job 210 and second job 220 by executing eight tasks and reusing four tasks.

Figure 4A:
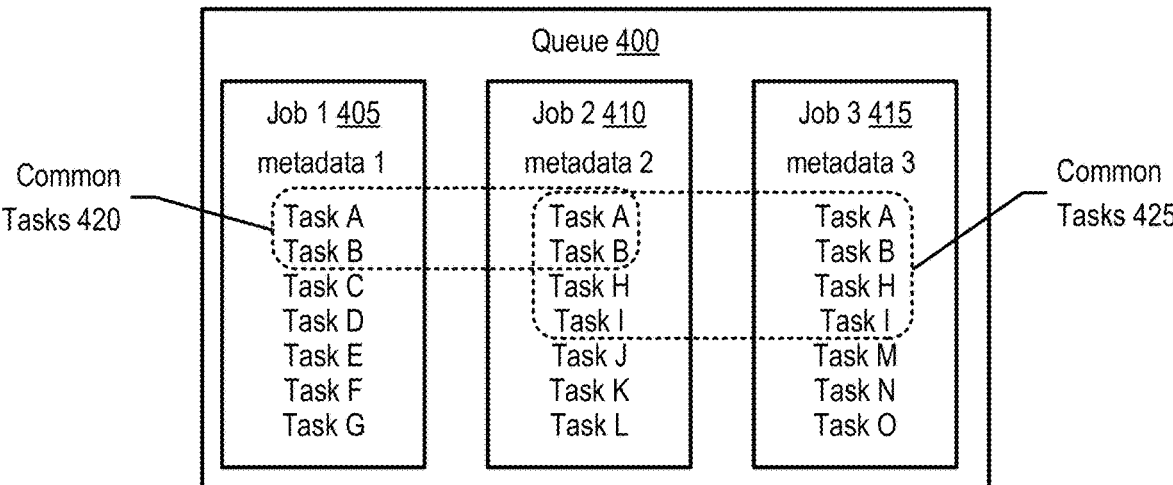
FIG. 4A is an illustration of an example that shows different sets of common tasks between multiple jobs, in accordance with some embodiments of the present disclosure.

FIG. 4A is an illustration of an example that shows different sets of common tasks between multiple jobs, in accordance with some embodiments of the present disclosure.

Referring to FIG. 4A, queue 400 includes job 1 405, job 2 410, and job 3 415. Each of the jobs have common tasks and different tasks relative to each other. Job 1 405 and job 2 410 include common tasks 420. Job 2 410 and job 3 415 include common tasks 425. The present disclosure reduces the amount of tasks to execute for completing the three different jobs by reusing the common tasks and creating new jobs for the different tasks (see FIG. 4B and corresponding text for further details).

Figure 4B:
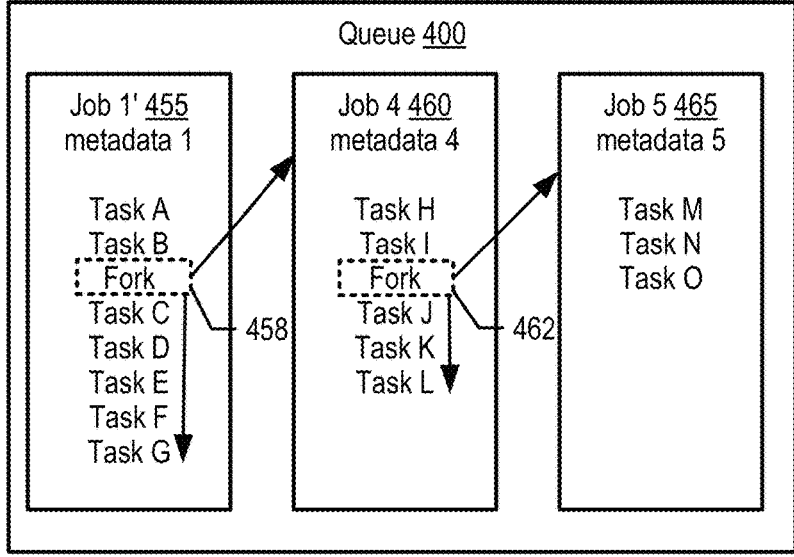
FIG. 4B is an illustration of an example that shows a modified job and new jobs based on different tasks between the multiple queued jobs, in accordance with some embodiments of the present disclosure.

FIG. 4B is an illustration of an example that shows a modified job and new jobs based on different tasks between the multiple queued jobs, in accordance with some embodiments of the present disclosure.

Referring to FIG. 4B, after processing device 115 analyzes job 1 405, job 2 410, and job 3 415 in FIG. 4A, processing device 115 creates job 1' 455 and inserts fork 458 after task B. During execution, fork 458 branches to a new job 4 460. Job 4 460 includes the different tasks from job 1 405 that are included in job 2 410. Job 4 460 includes fork 462, which branches to new job 5 465. Job 5 465 includes the different tasks from job 2 410 that are included in job 3 415. In some embodiments, jobs 4 460 and jobs 465 may include join commands when they include common tasks after the different tasks to further increase task execution reuse.

FIG. 5 is a flow diagram of a method of reusing common tasks, creating a new delta task job, and executing the common tasks and new delta task job, in accordance with some embodiments of the present disclosure. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by processing device 115 shown in FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 502, where processing logic analyzes a first job (e.g., first job 210 in FIG. 2) and a second job (e.g., second job 220 in FIG. 2). The first job includes first tasks (e.g., first tasks 215 in FIG. 2) and the second job includes second tasks (e.g., second tasks 225 in FIG. 2). The processing logic identifies a set of different tasks (e.g., different tasks 245 in FIG. 2) between the first tasks and the second tasks.

At block 504, the processing logic creates a third job (e.g., third job 230 in FIG. 2) based on the set of different tasks. The third job includes metadata (e.g., metadata 235 in FIG. 2) corresponding to the first job and the second job. At block 506, the processing logic executes the first job and the third job. The processing logic completes the second job, based on the metadata included in the third job, by executing the first job and the third job.

Figure 6:
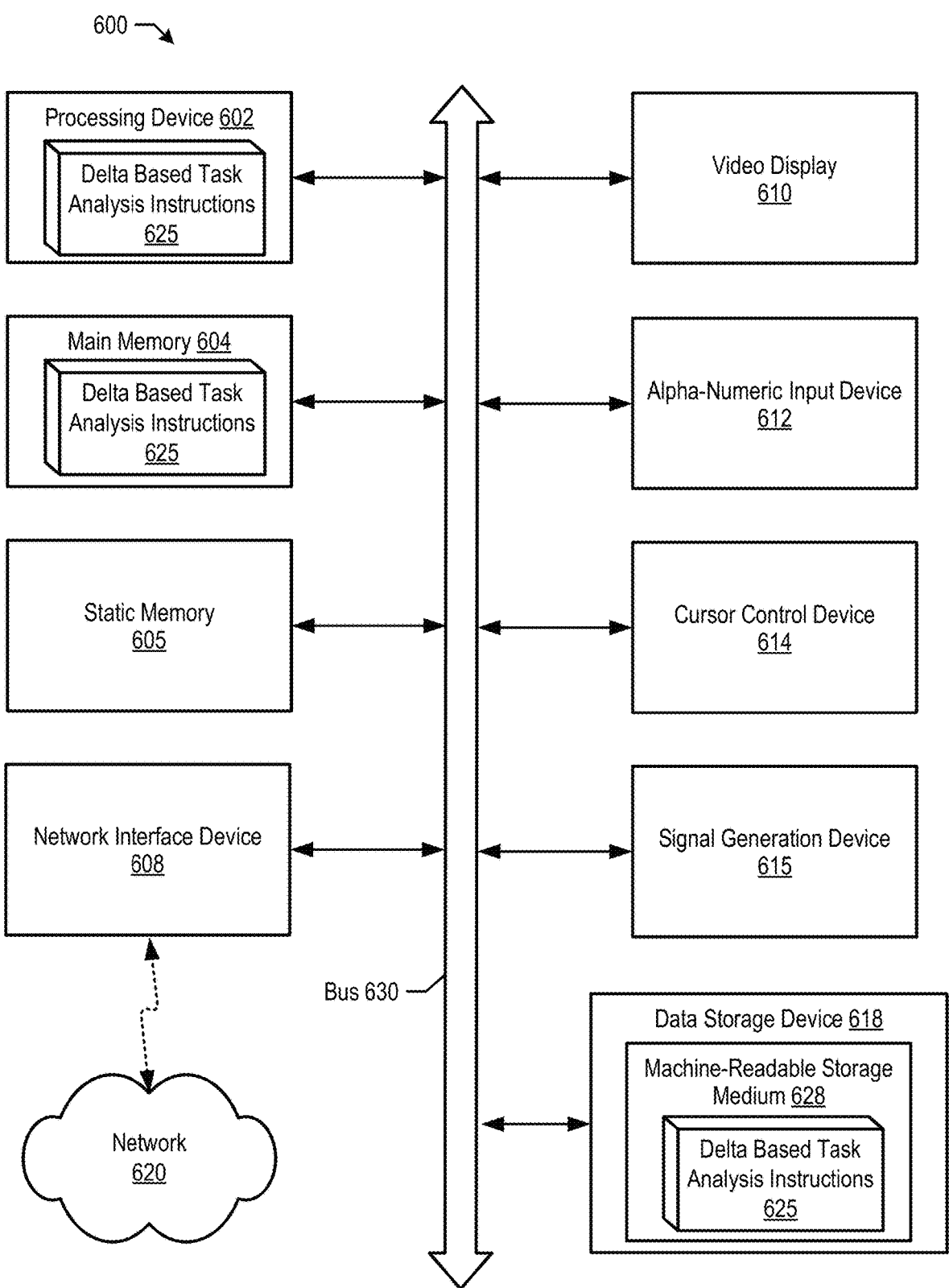
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments of the present disclosure, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments of the present disclosure, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute annotation driven just in time and state-based RBAC policy control instructions, referred to herein as delta based task analysis instructions 625, for performing the operations and steps discussed herein.

The data storage device 618 may include a machine-readable storage medium 628, on which is stored one or more sets of delta based task analysis instructions 625 (e.g., software) embodying any one or more of the methodologies of functions described herein. The delta based task analysis instructions 625 may also reside, completely or at least partially, within the main memory 604 or within the processing device 602 during execution thereof by the computer system 600; the main memory 604 and the processing device 602 also constituting machine-readable storage media. The delta based task analysis instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "inserting," "compiling," "executing," "sending," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and are not to be limited to the details given herein, but may be modified within the scope and equivalents of the appended claims.

What is claimed is:

1. A method comprising:

analyzing a first job and a second job, wherein the first job comprises a plurality of first tasks and the second job comprises a plurality of second tasks, and wherein the analyzing identifies a set of different tasks between the plurality of first tasks and the plurality of second tasks;

identifying a fork location and a join location in the first job, and inserting a fork command at the identified fork location and a join command at the identified join location;

creating, by a processing device, a third job comprising the set of different tasks and metadata corresponding to the first job and the second job, wherein the third job is a standalone executable job and is without a set of continuous common tasks between the first job and the second job, and wherein the metadata indicates an indication of the set of continuous common tasks between the first job and the second job and an indication of the set of different tasks; and executing both the first job and the third job, wherein the executing of the first job and the third job completes the second job based on the metadata included in the third job by reusing results of the set of continuous common tasks from the first job and executing the set of different tasks in the third job to avoid re-executing the set of continuous common tasks for the second job, wherein the executing further comprises executing the first job until encountering the fork command, forking to the third job while continuing execution the first job, and joining the third job back to the first job upon encountering the join command.

2. The method of claim 1, further comprising:

identifying, in the first job, the fork location between the set of continuous common tasks and the set of different tasks; and inserting the fork command at the fork location in the first job, wherein the fork command adds a branch to the first job that branches to the third job subsequent to the executing of the set of continuous common tasks.

3. The method of claim 2, wherein the set of continuous common tasks is a first set of continuous common tasks, the method further comprising:

identifying, during the analyzing, a second set of continuous common tasks subsequent to the set of different tasks; and inserting, in the first job, the join command between the set of different tasks and the second set of continuous common tasks.

4. The method of claim 2, wherein the set of continuous common tasks are included in both the plurality of first tasks and the plurality of second tasks in a same order, and the set of different tasks are included in the plurality of second tasks and are absent from the plurality of first tasks.

5. The method of claim 1, further comprising:

inserting a third task into the third job based on the one or more differences between the first job and the second job.

6. The method of claim 1, further comprising:

capturing one or more snapshots of the first job during the executing;

receiving a request to execute a fourth job;

determining that the fourth job comprises a set of third continuous tasks corresponding to at least one of the one or more snapshots;

responsive to the determining, modifying the fourth job by replacing the set of fourth continuous tasks with the at least one of the one or more snapshots; and executing the modified fourth job.

7. A system comprising:

a memory; and a processing device operatively coupled to the memory, the processing device to:

analyze a first job and a second job, wherein the first job comprises a plurality of first tasks and the second job comprises a plurality of second tasks, and wherein the analysis identifies a set of different tasks between the plurality of first tasks and the plurality of second tasks;

identify a fork location and a join location in the first job, and inserting a fork command at the identified fork location and a join command at the identified join location;

create a third job comprising the set of different tasks and metadata corresponding to the first job and the second job, wherein the third job is a standalone executable job and is without a set of continuous common tasks between the first job and the second job, and wherein the metadata indicates an indication of the set of continuous common tasks between the first job and the second job and an indication of the set of different tasks; and execute both the first job and the third job, wherein the executing of the first job and the third job completes the second job based on the metadata included in the third job by reusing results of the set of continuous common tasks from the first job and executing the set of different tasks in the third job to avoid re-executing the set of continuous common tasks for the second job, wherein the executing further comprises executing the first job until encountering the fork command, forking to the third job while continuing execution the first job, and joining the third job back to the first job upon encountering the join command.

8. The system of claim 7, wherein the processing device is to:

identify, in the first job, the fork location between the set of continuous common tasks and the set of different tasks; and insert the fork command at the fork location in the first job, wherein the fork command adds a branch to the first job that branches to the third job subsequent to the executing of the set of continuous common tasks.

9. The system of claim 8, wherein the set of continuous common tasks is a first set of continuous common tasks, the processing device is to:

identify, during the analysis, a second set of continuous common tasks subsequent to the set of different tasks; and insert, in the first job, the join command between the set of different tasks and the second set of continuous common tasks.

10. The system of claim 8, wherein the set of continuous common tasks are included in both the plurality of first tasks and the plurality of second tasks in a same order, and the set of different tasks are included in the plurality of second tasks and are absent from the plurality of first tasks.

11. The system of claim 7, wherein the processing device is to:

insert a third task into the third job based on the one or more differences between the first job and the second job.

12. The system of claim 7, wherein the processing device is to:

capture one or more snapshots of the first job during the executing;

receive a request to execute a fourth job;

determine that the fourth job comprises a set of third continuous tasks corresponding to at least one of the one or more snapshots;

modify the fourth job by replacing the set of fourth continuous tasks with the at least one of the one or more snapshots; and execute the modified fourth job.

13. A non-transitory computer readable medium, having instructions stored thereon which, when executed by a processing device, cause the processing device to:

analyze a first job and a second job, wherein the first job comprises a plurality of first tasks and the second job comprises a plurality of second tasks, and wherein the analysis identifies a set of different tasks between the plurality of first tasks and the plurality of second tasks;

identify, by the processing device, a fork location and a join location in the first job, and inserting a fork command at the identified fork location and a join command at the identified join location;

create, by the processing device, a third job comprising the set of different tasks and metadata corresponding to the first job and the second job, wherein the third job is a standalone executable job and is without a set of continuous common tasks between the first job and the second job, and wherein the metadata indicates an indication of the set of continuous common tasks between the first job and the second job and an indication of the set of different tasks; and execute both the first job and the third job, wherein the executing of the first job and the third job completes the second job based on the metadata included in the third job by reusing results of the set of continuous common tasks from the first job and executing the set of different tasks in the third job to avoid re-executing the set of continuous common tasks for the second job, wherein the executing further comprises executing the first job until encountering the fork command, forking to the third job while continuing execution the first job, and joining the third job back to the first job upon encountering the join command.

14. The non-transitory computer readable medium of claim 13, wherein the processing device is to:

identify, in the first job, the fork location between the set of continuous common tasks and the set of different tasks; and insert the fork command at the fork location in the first job, wherein the fork command adds a branch to the first job that branches to the third job subsequent to the executing of the set of continuous common tasks.

15. The non-transitory computer readable medium of claim 14, wherein the set of continuous common tasks is a first set of continuous common tasks, the processing device is to: and identify a second set of continuous common tasks subsequent to the set of different tasks;

insert, in the first job, the join command between the set of different tasks and the second set of continuous common tasks.

16. The non-transitory computer readable medium of claim 14, wherein the set of continuous common tasks are included in both the plurality of first tasks and the plurality of second tasks in a same order, and the set of different tasks are included in the plurality of second tasks and are absent from the plurality of first tasks.

17. The non-transitory computer readable medium of claim 13, wherein the metadata indicates one or more similarities between the first job and the second job, and also indicates one or more differences between the first job and the second job, and wherein the processing device is to:

insert a third task into the third job based on the one or more differences between the first job and the second job.

18. The non-transitory computer readable medium of claim 13, wherein the processing device is to:

capture one or more snapshots of the first job during the executing;

receive a request to execute a fourth job;

determine that the fourth job comprises a set of third continuous tasks corresponding to at least one of the one or more snapshots;

modify the fourth job by replacing the set of fourth continuous tasks with the at least one of the one or more snapshots; and execute the modified fourth job.

* * * * *